(12) United States Patent
Gursel

(10) Patent No.: US 7,677,485 B2
(45) Date of Patent: Mar. 16, 2010

(54) MULTI-BLADE FOOD PROCESSING APPARATUS

(75) Inventor: Ilhan Gursel, Avcilar Istanbul (TR)

(73) Assignee: Euro-Pro Operating, LLC., Newton, MA (US)

( * ) Notice: Subject to any disclaimer, the term of this patent is extended or adjusted under 35 U.S.C. 154(b) by 0 days.

(21) Appl. No.: 12/201,517

(22) Filed: Aug. 29, 2008

(65) Prior Publication Data

US 2008/0314215 A1 Dec. 25, 2008

Related U.S. Application Data

(60) Division of application No. 10/454,118, filed on Jun. 4, 2003, now Pat. No. 7,419,111, which is a continuation-in-part of application No. 10/251,679, filed on Sep. 23, 2002, now abandoned.

(51) Int. Cl.
*B02C 4/06* (2006.01)
*B02C 9/02* (2006.01)
*B02C 4/18* (2006.01)
*A47J 17/00* (2006.01)

(52) U.S. Cl. .............. 241/282.1; 241/282.2; 241/292.1

(58) Field of Classification Search .............. 241/282.1, 241/282.2, 292.1
See application file for complete search history.

(56) References Cited

U.S. PATENT DOCUMENTS

| | | | | |
|---|---|---|---|---|
| 3,139,917 | A * | 7/1964 | Elmore | 241/199.12 |
| 4,127,342 | A * | 11/1978 | Coggiola | 403/243 |
| 4,733,827 | A * | 3/1988 | Williams | 241/101.2 |
| 4,817,878 | A * | 4/1989 | Shibata | 241/282.2 |
| 5,823,672 | A * | 10/1998 | Barker | 366/205 |
| 5,921,485 | A * | 7/1999 | Plavcan et al. | 241/282.2 |
| 6,092,922 | A * | 7/2000 | Kett et al. | 366/205 |
| 6,532,863 | B1 * | 3/2003 | Lee | 99/348 |

* cited by examiner

*Primary Examiner*—Bena Miller
(74) *Attorney, Agent, or Firm*—McCarter & English, LLP; Michael I. Wolfson

(57) ABSTRACT

A multi-blade food processing apparatus having two independent blade assemblies, each of which blade assemblies having two opposed horizontal cutting blades, wherein the upper of two independent blade assemblies is selectively removable from the apparatus, the cutting blades are spaced apart in elevation, and are offset in orientation 90 degrees for improved cutting efficiency. The blade assemblies are positioned at 90 degrees from each other but may include additional positions for orienting the blades at any angle with respect to each other.

8 Claims, 5 Drawing Sheets

MULTI-BLADE FOOD PROCESSING APPARATUS

CROSS-REFERENCE TO RELATED APPLICATIONS

This application is a divisional of application Ser. No. 10/454,118 filed on Jun. 4, 2003, now U.S. Pat. No. 7,419,111 which is a continuation-in-part of application Ser. No. 10/251,679 filed on Sep. 23, 2002 now abandoned.

BACKGROUND OF THE INVENTION

This invention relates to a multi-blade food processing apparatus having a removable blade assembly. More particularly, the invention relates to an multi-blade food processing apparatus including two independent blade assemblies, each of which has two opposed substantially horizontal cutting blades, to provide increased chopping height and with the upper of two independent blade assemblies being selectively removable from the apparatus.

Numerous food processing apparatuses such as food processors and blenders are known, each of which is designed to achieve a desired level of cutting, chopping and/or mixing of the various foodstuffs deposited therein by the user. These devices serve to accomplish their desired goal with a greater or lesser degree of overall efficiency. Common to each of the available prior art food processors are the use of a rotatable shaft having attached thereto cutting blades of varying configurations, which is usually driven by an electric motor.

U.S. Pat. No. 4,817,878 to Shibata and U.S. Pat. No. 4,744,522 to Borgmann et al., each disclose standard food processors having cutting arrangements with two opposed horizontal cutting blades. The cutting blades are spaced apart typically about one inch from each other and are mounted on a removable cylindrical hub that is mounted on the motor shaft.

U.S. application No. 2002/0139884 to Williams, et al., and U.S. Pat. No. 2,771,111 to Seyfried, U.S. Pat. No. 2,964,301 to Bosse, U.S. Pat. No. 4,260,267 to Walton, U.S. Pat. No. 5,823,672 to Barker, U.S. Pat. No. 5,875,706 to Borger, et al., and U.S. Pat. No. 6,092,922 to Kett, et al. all disclose food processors or blenders (or other types of mixers) including at least one blade assembly having blade angularly offset from the rotating shaft. The patent to Barker further discloses a blender equipped with two axially spaced blade assemblies mounted to the same rotational shaft. Each assembly includes blades that are angularly offset from the shaft. Barker, Walton, Seyfried, Kett, et al. U.S. Pat. No. 6,092,922 and the upper angularly oriented blades in Borger include multiple blades mounted at the same location on the shaft.

U.S. Pat. No. 241,278 to Barnard, U.S. Pat. No. 917,206 to Watts and U.S. Pat. No. 1,017,820 to Svebilius disclose multiple blade rotor assemblies in a conveyor, circulator and propeller, respectively, in which at least one blade is angularly adjustable relative to another blade. The patents to Watts and Svebilius further disclose hubs with a seated tooth arrangement to secure the blades together.

While a variety of blade arrangements are shown in the art, no apparatus described in the art is directed to a food processing apparatus having at least one removable separate blade assembly on the motor shaft to increase chopping efficiency. Accordingly, it is desirable to provide a food processing apparatus having a blade configuration with increased cutting height, chopping efficiency and convenience.

SUMMARY OF THE INVENTION

A multi-blade food processing apparatus having two independent blade assemblies, each of which has two opposed spaced apart horizontal cutting blades, wherein the upper of the two independent blade assemblies is selectively removable from the apparatus is provided. The lower cutting blade assembly is fixedly mounted to the lower portion of a hub having an internal socket to engage a rotating shaft driven by the motor. The upper blade assembly includes a projecting member that engages the rotating shaft. A slot on the main hub is inclined towards the rear of the main blade cutting surfaces to secure the upper assembly during rotation. The blades in each assembly are spaced apart about one inch and are mounted at 180 degrees from each other, and are curved in the conventional fashion for a food processor. This enables cutting at increased height within the processing apparatus bowl.

Accordingly, it is an object of the invention to provide a food processing apparatus which is capable of exhibiting enhanced cutting efficiency over such similar devices as have heretofore been available.

It is another object of the invention to provide a blade assembly for a food processing apparatus having increased efficiency utilizing a conventional food processing apparatus.

It is a further object of the invention to provide a food processing apparatus and blade assembly that is selectively capable of being utilized in alternative modes with either a single two blade cutting assembly or a dual two blade cutting assembly.

Yet another object of the invention is to provide a food processing blade assembly that chops and cuts food more efficiently and at a higher level in the chopping bowl.

Yet a further object of the invention is to provide a blade assembly for a food processing apparatus having a removable upper blade assembly that allows for easier cleaning of the blades.

Still another object of the invention is to provide a driven electric-powered cutter-parting, stirrer blender, robot and mixer, etc. devices of either house type or industrial type with a multi-point center and multi-wings positioned at every possible angle with respect to each other and locked to middle axis.

Still other objects and advantages of the invention will in part be obvious and will in part be apparent from the specification.

The invention accordingly comprises products possessing the features, properties, and the relation of components which will be exemplified in the products hereinafter described, and the scope of the invention will be indicated in the claims.

BRIEF DESCRIPTION OF THE DRAWINGS

For a fuller understanding of the invention, reference is had to the following description taken in connection with the accompanying drawing(s), in which.

DESCRIPTION OF THE PREFERRED EMBODIMENTS

Figure 1:
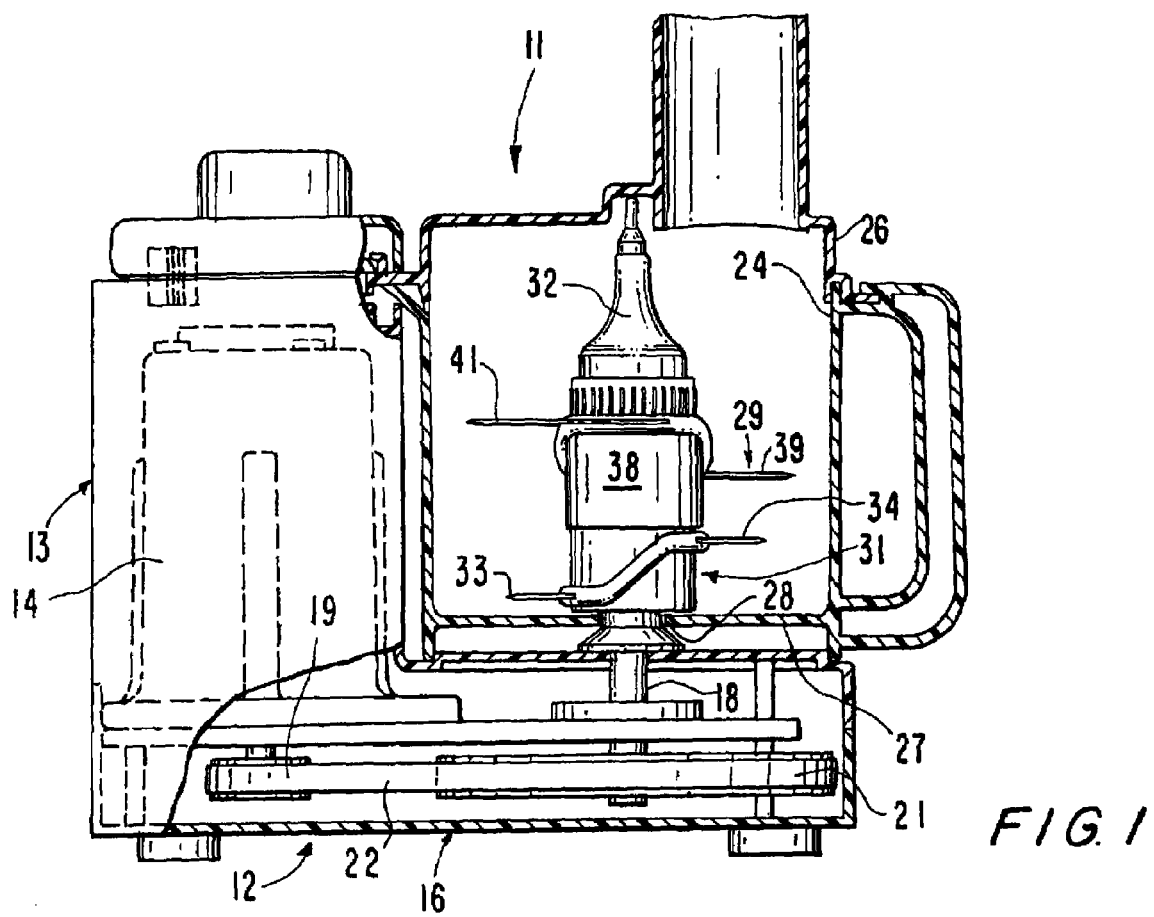
FIG. 1 is an elevational view of a food processing apparatus having a multi-blade assembly constructed and arranged in accordance with the invention.

A multi-blade food processing apparatus constructed and arranged in accordance with the invention has a main hub with a fixed blade assembly and a second removable blade assembly. Each blade assembly has two opposed horizontal cutting blades, wherein the upper of two independent blade assemblies is selectively removable from the main hub. The lower fixed blade assembly may be utilized alone in the usual manner. The multi-blade assembly may be utilized in a conventional food processor, blender, food chopper or hand blender device.

When assembled together the upper portion of the multi-blade assembly and the lower portion of the multi-blade assembly form one cohesive assembly wherein the two opposing blades of the lower blade assembly are mounted on a hollow hub and orientated at 90 degrees from the two opposing blades of the upper blade assembly. The hub of the upper assembly engages the main hub by a key on the hollow hub and an inclined and horizontal key slot provided on the main hub that securely lock when the shaft is rotated. The blade assemblies easily lock and unlock as desired. Multiple blade angles are possible with cooperating internal protrusions and keys provided on the hubs.

Thus, a food processing apparatus constructed and arranged in accordance with the invention has two separate cutting blades assemblies which cooperate on the same rotational shaft. The assembly includes a first lower cutting blade assembly mounted on the lower portion of a main hub having a hexagonal socket to be mounted on a hexagonal rotating shaft which is coupled to a motor. The first lower cutting blade assembly has two cutting blades which are spaced apart in elevation between about 12 to 30 mm from each other and are mounted on the lower portion of the hub at 180 degrees from each other. These blades may be curved in the conventional fashion for food processor blades.

The second upper cutting blade assembly has two similar blades mounted on a hollow cylindrical hub having at least one internal key for engaging at least one cooperating key slot on the main hub for mounting at 90 degrees to the first blade assembly on the processor hub. Thus, the four cutting blades of the two blade assemblies cut in locations separate of each other and not one on top of the other.

The upper blades are also spaced apart between about 12 to 30 mm from each other. Thus, when the upper blade assembly is engaged on the shaft, the three axial spaces between the four blades are substantially the same to provide a total cutting depth of between about 50 to 75 mm. When mounted on the hexagonal motor shaft, the upper cutting blade of the upper assembly will chop at a level of at least one-third and preferably about half the height of a typical food processor bowl of about 1500-2500 ml.

The key and slot arrangement on the upper blade assembly and main hub is inclined or oriented in a direction away from the blade cutting surface. A preferred configuration includes an inclined upper slot opening and a lower horizontal slot to ensure that when the processor is turned on and the blades rotate, the projection or key on the upper blade assembly is forced into secure engagement in the key slot.

FIG. 1 shows a food processor 11 having a typical food processor L-shaped housing 12 including an upright portion 13 housing an electric motor 14 and a horizontal portion 16 for supporting a chopping bowl 17. Motor 14 drives a motor shaft 18 and rotates a small toothed pulley 19 coupled to a large toothed pulley 21 by an internally toothed endless belt 22. Pulley 19 can also function as a fan for motor 14. An upwardly extending blade shaft 23 driven by pulley 21 extends upwardly from horizontal portion 16 into bowl 17. Belt 22 and pulleys 19 and 21 are disposed in the relatively flat lower portion of horizontal portion 16 of housing 12. Bowl 17 has an open top 24 with a removable cover 26 and a closed bottom 27 with an upwardly projecting column and opening 28 for shaft 18. Bowl 17 also includes a handle 29 for easy handling of bowl 17 and is preferably made of light-transmitting material. This enables a user to observe the treatment of one or more foodstuffs in bowl 17 when in operation.

A lower cutting blade assembly 31 includes a main hub 32 with a first lower blade 33 and a second upper blade 34 configured in the usual fashion for a food processor. Main hub 32 includes an integral internal axial hexagonal socket 36 shown in FIG. 3 for mounting on hexagonal shaft 18. A second upper cutting blade assembly 37 includes a hollow cylindrical hub 38 with a lower blade 39 and an opposed upper blade 41 mounted thereon. Upper blade assembly 37 is selectively mounted on hub 32 and positioned over lower blades 33 and 34.

Figure 2:
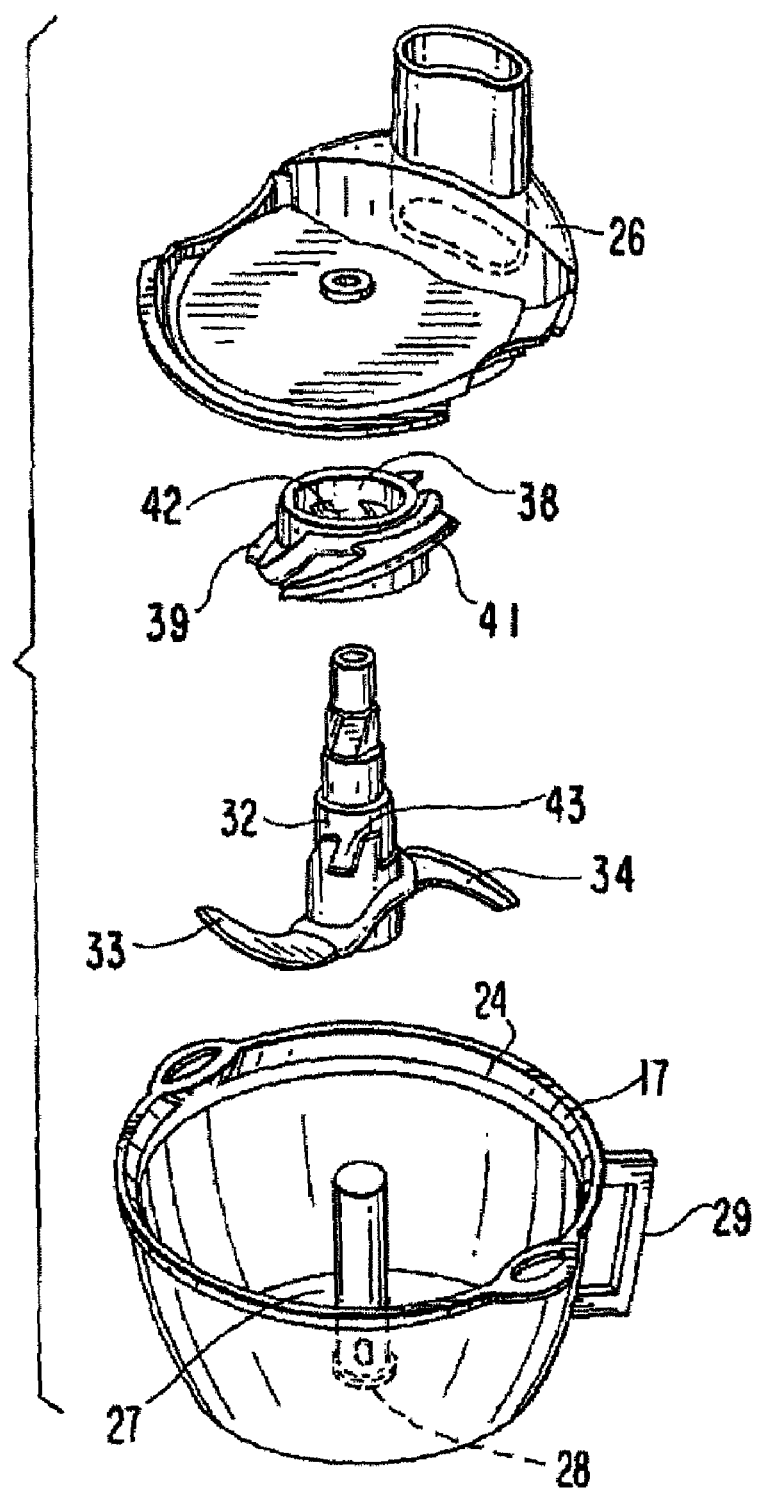
FIG. 2 is an exploded perspective view of the food processing apparatus of FIG. 1 showing an inclined key slot arrangement for securing the upper blade assembly at any angle to the bottom fixed blade assembly.

As shown in FIG. 2, lower blade assembly 31 includes opposed cutting blades 33 and 34 that are spaced apart between about 12 to 30 mm in elevation from each other. Blades 39 and 41 of upper cutting blade assembly 37 are also spaced apart the same distance. Preferably the blades are separated by between about 18 to 24 mm in elevation from each other. With upper cutting blade assembly 37 affixed to main hub 32 and positioned adjacent to lower cutting blade assembly 31 as shown, lower blade 39 of upper cutting blade assembly 37 will be spaced about 12 to 30 mm in elevation from upper blade 34 of lower blade assembly 31. In this embodiment, blades 33 and 34 and blades 39 and 41 are about 21 mm apart. The total distance from the top of blade 41 to the bottom of blade 37 is about 62 mm. The distance between the top of blade 34 to the bottom of blade 39 is about 21 mm.

This configuration provides for cutting and chopping at a higher level in bowl 26 of approximately 2500 ml. For example, upper blade 41 of upper blade assembly 37 is at a level of at least one-third the height of bowl 17, and preferably it is at a level over one-half the height of bowl 17, or at about the measured 1250 ml mark.

Figure 3:
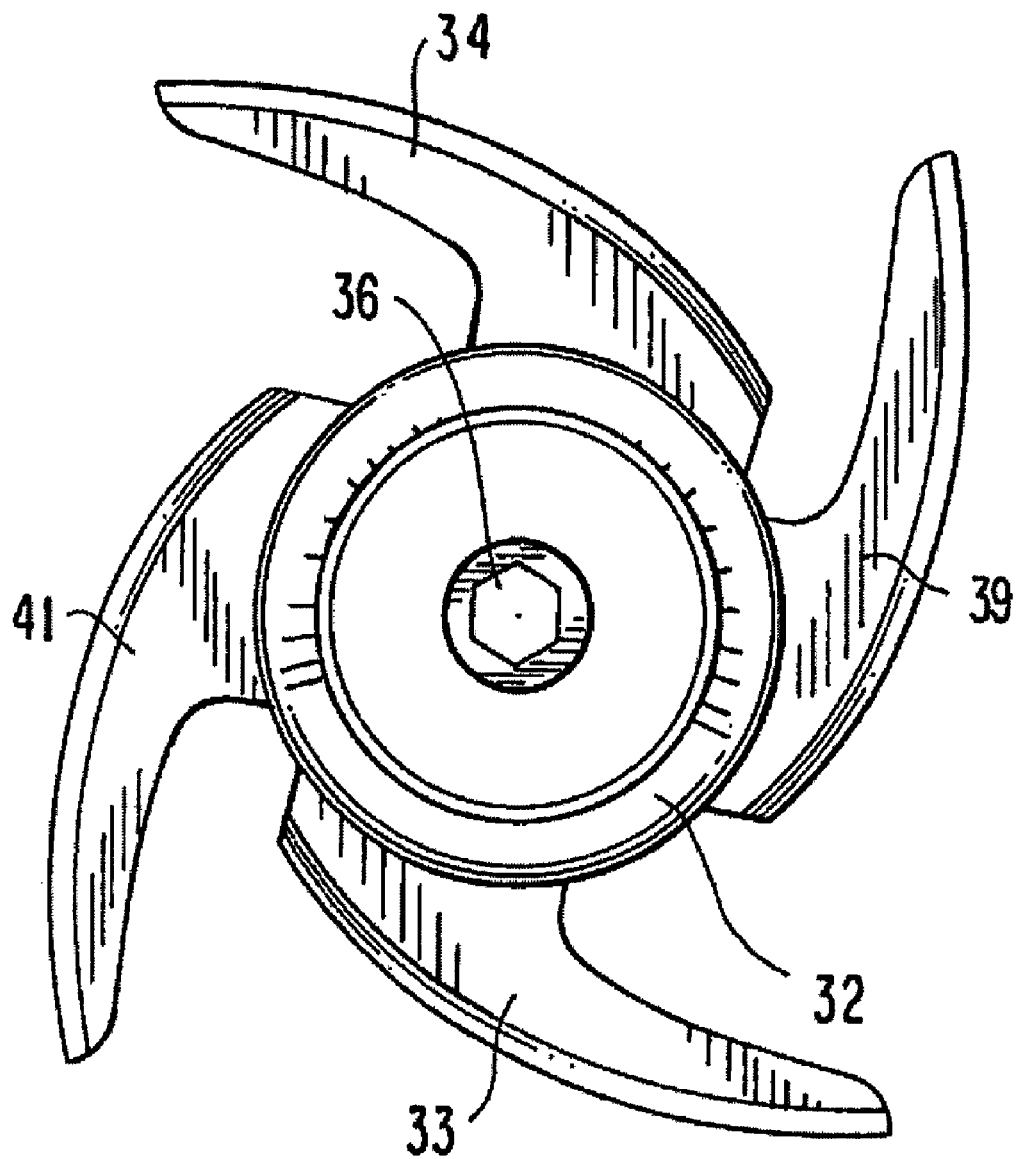
FIG. 3 is a bottom plan view of a main hub of the multi-blade assembly in accordance with the invention with the blade assemblies at 90 degrees and showing a hexagonal socket for engaging the main hub to a driven hexagonal shaft.

FIG. 3 is a bottom view of cutting blade assemblies 31 and 37 showing hexagonal socket 36 that mates with hexagonal shaft 23 shown in FIG. 1.

Figure 4:
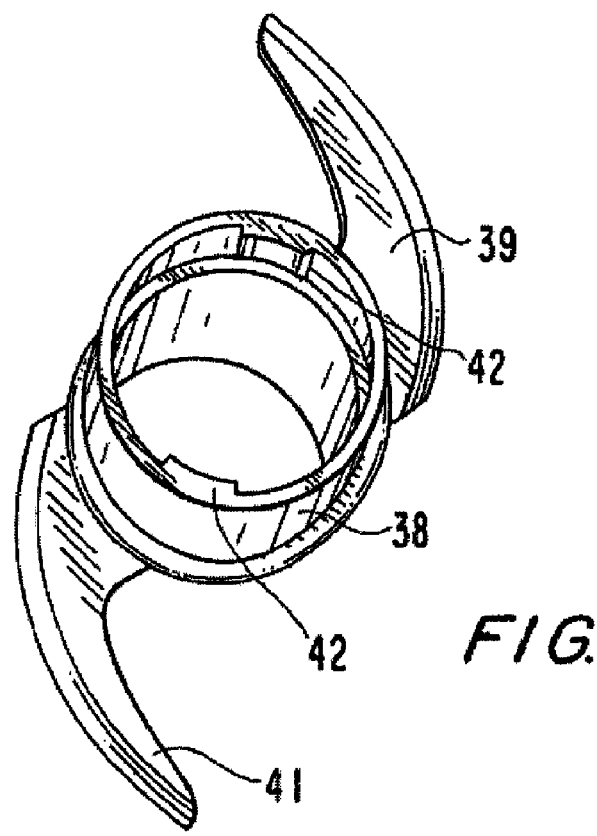
FIG. 4 is a perspective view of the interior of upper blade assembly of FIGS. 2 and 3, showing the key for securing the upper blade assembly to the fixed lower blade assembly.
Figure 5:
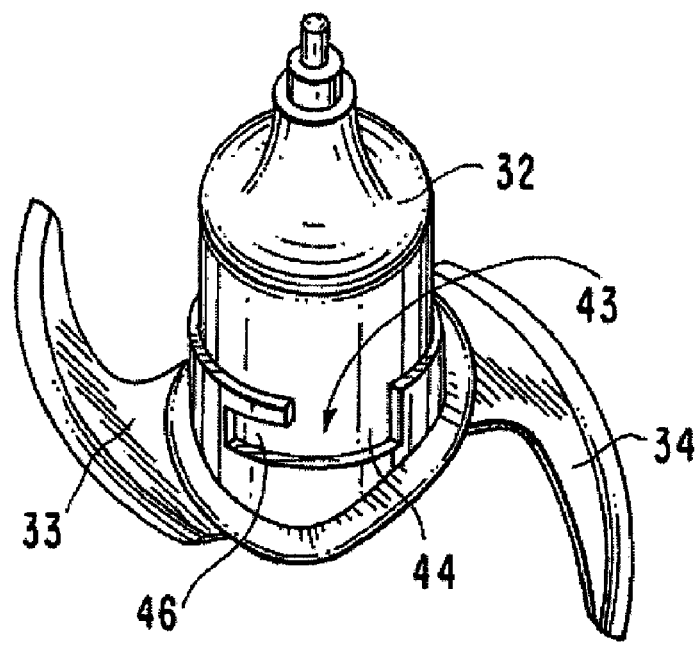
FIG. 5 is a perspective view of lower blade assembly 31 with a slot for receiving the keys of the upper blade assembly of FIG. 4.

FIG. 4 is a perspective view of upper blade assembly 37 showing the interior of hollow upper hub 38. A pair of opposed projections or keys 42 are formed on the cylindrical interior of hub 38. FIG. 5 shows lower main hub 32 that includes two opposed key slots 43 for receiving keys 42 formed on the inside of hub 38. Slots 43 are formed with a substantially vertical opening 44 and a lower horizontal slot 46 are oriented towards the rear of blades 33 and 34 of lower blade assembly 31 to insure that keys 42 are urged into engagement with hub 32 when shaft 23 rotates. This firmly affixes and engages upper cutting blade assembly 37 to hub 32.

Figure 6:
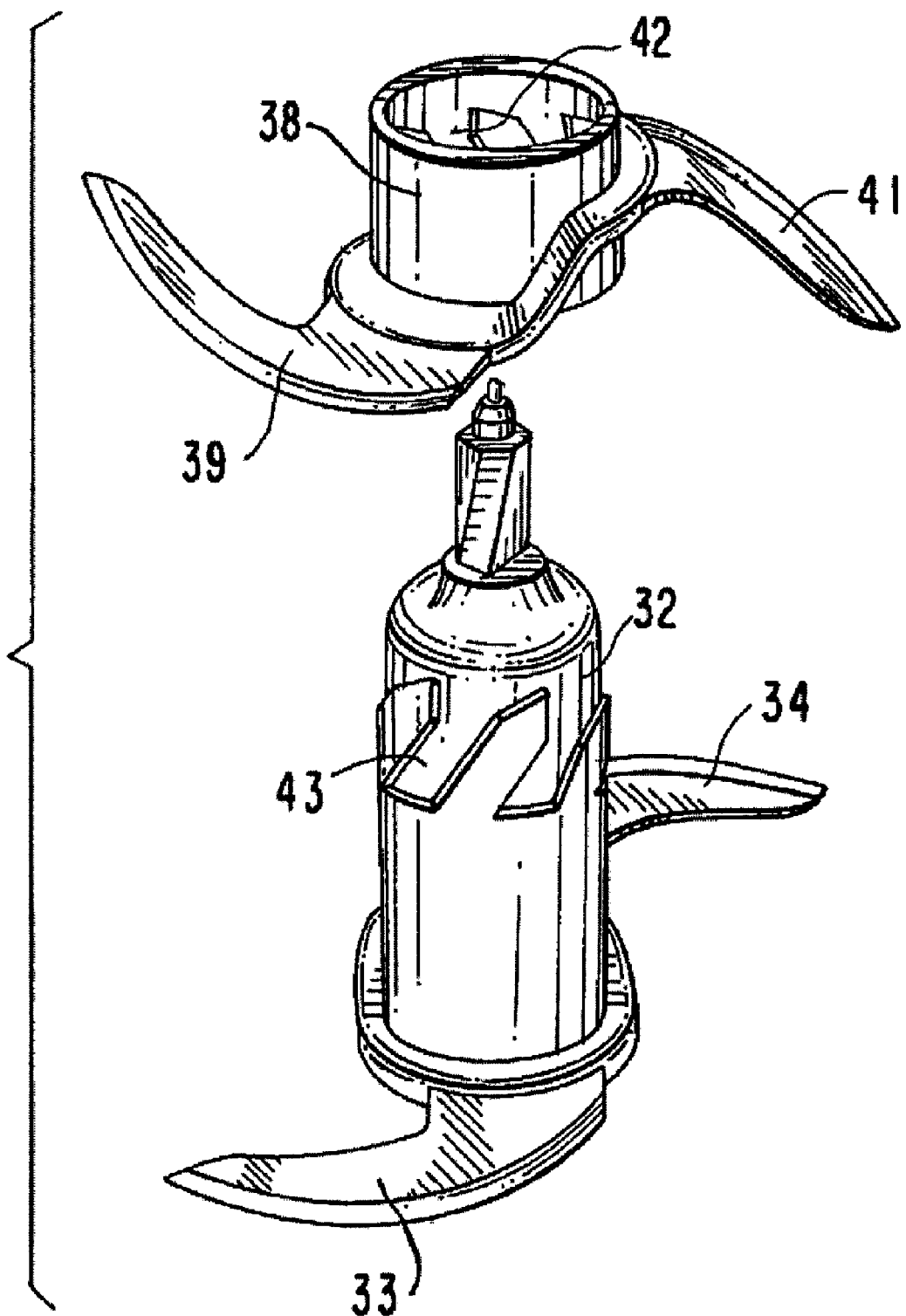
FIG. 6 is a perspective view showing multiple key slots for engaging an upper blade assembly at any angle in relation to the lower blade assembly.

Multiple blade orientations are possible in accordance with the invention as shown in perspective in FIG. 6. Here, an upper blade assembly 51 includes a hollow hub 52 with a plurality of projections or keys 53. A lower blade assembly 54 includes a main hub 56 with a plurality of key slots 57. This configuration is suitable for industrial blades with a multi-point center and multi-wings which can be used with any driven, electric-powered, cutter-parting, stirrer blender, robot and mixer, etc. devices for either house type or industrial use. The blades may be positioned at every possible angle with respect to each other and locked to main hub 56.

The invention wherein a blade with multi-centers and multi-wings used instead of a blade with single center and two wings, the time of function is decreased by half as compared to the use of single blade, cut pieces of various foodstuff have identical sizes, ice dices are uniformly broken down into snow sprinkles in a very short period of time if engine power is sufficient for this purpose and some of the non-stiff foodstuff are fragmented without becoming juicy.

It will thus be seen that the objects set forth above, among those made apparent from the preceding description, are efficiently attained and, since certain changes may be made in the above product without departing from the spirit and scope of the invention, it is intended that all matter contained in the above description and shown in the accompanying drawing(s) shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A blade assembly comprising,
    a lower blade assembly formed with a main hub having two opposed cutting blades fixed to the main hub and at least one slot on the outer surface of the main hub;
    an upper blade assembly formed with a hollow cylindrical hub having two opposed cutting blades fixed to the outer surface thereof having at least one key on the interior surface thereof mountable on the outer surface of the main hub, and
    the cylindrical hub of the upper blade assembly fits onto and is secured to the main hub by the at least one key cooperating with the slot on the main hub, the cylindrical hub being selectively removable from the main hub;
    wherein the lower of the said two independent blade assemblies is operatable alone as the only cutting means or with the lower blade assembly and upper blade assembly functioning together as the cuffing means.

2. The blade assembly of claim 1, wherein each blade in each assembly is spaced apart between about 12 to 30 mm from each other.

3. The blade assembly of claim 1, wherein the at least one slot is inclined towards the rear of the blade cutting surfaces.

4. The blade assembly of claim 1, wherein the at least one slot on the main hub includes a substantially vertical opening for receiving the at least one key on the upper blade assembly and a horizontal region towards the rear of the cuffing surfaces at the bottom of the vertical opening to prevent the upper assembly from lifting out of the vertical opening.

5. The blade assembly of claim 1, wherein the cutting blades are curved cutting blades.

6. The blade assembly of claim 1, wherein the two opposed cuffing blades on the lower blade assembly and the upper blade assembly extend substantially horizontal from the hubs.

7. The blade assembly of claim 6, wherein the two opposed cutting blades on the lower blade assembly and the upper blade assembly are spaced apart.

8. The blade assembly of claim 1, wherein the two opposed cuffing blades on the lower blade assembly and the upper blade assembly are spaced apart.

\* \* \* \* \*

UNITED STATES PATENT AND TRADEMARK OFFICE
CERTIFICATE OF CORRECTION

PATENT NO. : 7,677,485 B2
APPLICATION NO. : 12/201517
DATED : March 16, 2010
INVENTOR(S) : Ilhan Gursel It is certified that error appears in the above-identified patent and that said Letters Patent is hereby corrected as shown below:

In claim 1, at column 6, line 8, please delete the word "cuffing" and replace with the word --cutting--.

Signed and Sealed this

Twenty-third Day of November, 2010

David J. Kappos
*Director of the United States Patent and Trademark Office*